United States Patent [19]
Ayres

[11] Patent Number: 6,068,381
[45] Date of Patent: May 30, 2000

[54] BACK LIGHTING DEVICE WITH CENTRAL OPENING FRAME MEMBER AND A UNITIZED LAMP AND RIGID RADIALLY EXTENDED TERMINALS ASSEMBLY

[75] Inventor: John A. Ayres, Lapeer, Mich.

[73] Assignee: Nu-Tech & Engineering, Inc., Lapeer, Mich.

[21] Appl. No.: 09/014,858

[22] Filed: Jan. 29, 1998

Related U.S. Application Data

[60] Provisional application No. 60/036,320, Jan. 31, 1997.

[51] Int. Cl.[7] ........................................................ F21V 7/04
[52] U.S. Cl. ............................... 362/31; 362/26; 362/226; 349/59; 349/65
[58] Field of Search ................................. 362/31, 26, 19, 362/226; 349/64, 62, 61, 63, 65–71, 59

[56] References Cited

U.S. PATENT DOCUMENTS

| | | | |
|---|---|---|---|
| 5,280,372 | 1/1994 | Horiuchi | 359/49 |
| 5,313,318 | 5/1994 | Gruenberg et al. | 359/49 |
| 5,363,294 | 11/1994 | Yamamoto et al. | 362/330 |
| 5,420,710 | 5/1995 | Nanbu | 359/83 |
| 5,654,779 | 8/1997 | Nakayama et al. | 349/58 |
| 5,815,227 | 9/1998 | Lee | 349/67 |
| 5,856,855 | 1/1999 | Mol et al. | 349/65 |
| 5,947,578 | 9/1999 | Ayres | 362/31 |

*Primary Examiner*—Thomas M. Sember
*Assistant Examiner*—John A. Ward
*Attorney, Agent, or Firm*—Fildes & Outland, P.C.

[57] ABSTRACT

A back lighting device is formed as an assembly of a frame, light waveguide, lamp and terminal assembly and a diffuser sheet. In one embodiment, the lamp and terminal assembly is received in a pocket through a rear opening in the frame and includes terminals having leg portions that are seated on seat portions in the pocket that optimally align a lamp member of the lamp and terminal assembly with an edge of the waveguide to provide optimum light transmission into the waveguide. The diffuser sheet covers the rear of the waveguide and extends across the rear opening of the pocket to limit the escape of light from the pocket and the waveguide to the rear of the back lighting device. The diffuser and frame are preferably molded of a white glass filled material that provides good diffusion of light reflected therefrom and reflects a maximum amount of diffused light back into the waveguide for transmission through a front surface for back lighting of a liquid crystal display or other light receiving member.

18 Claims, 5 Drawing Sheets

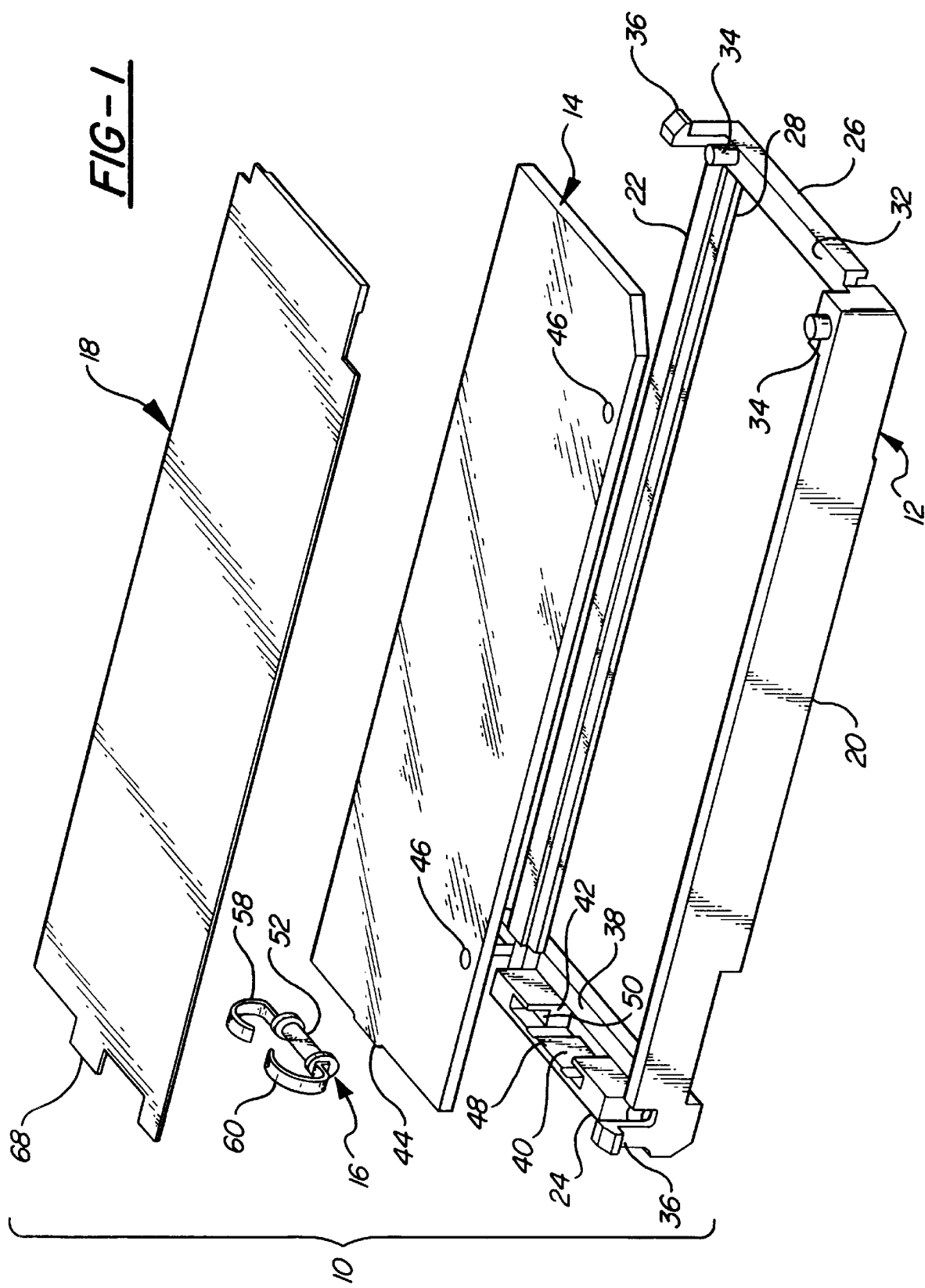

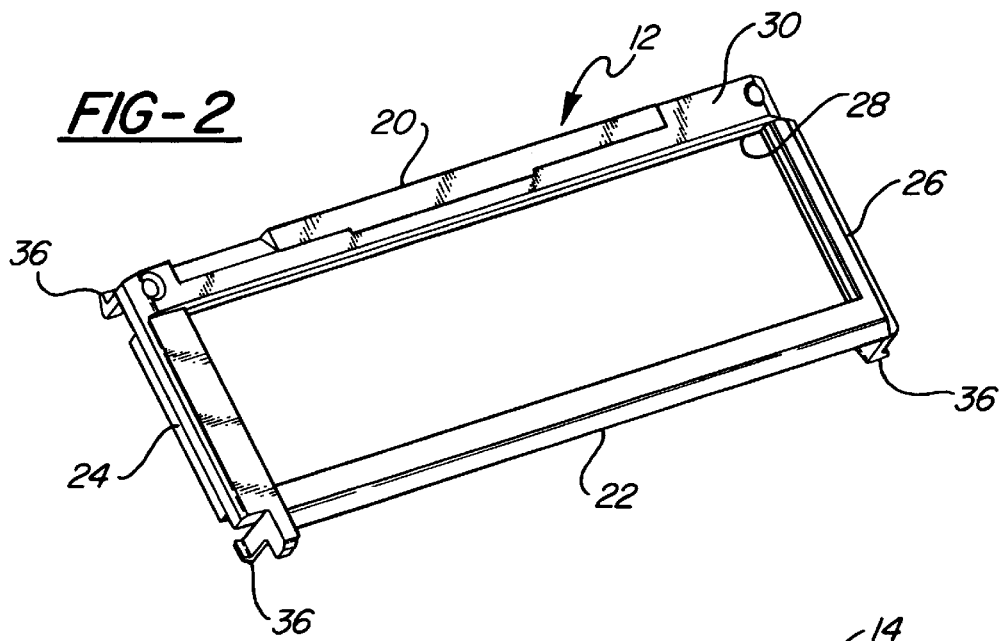
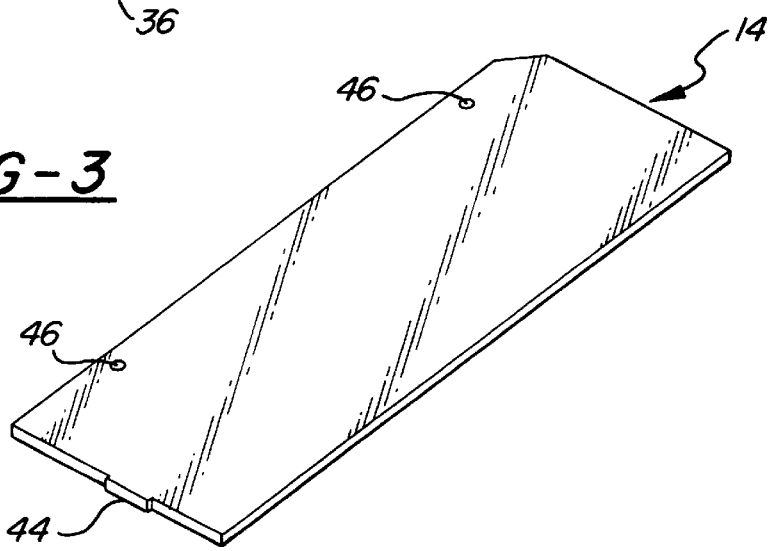
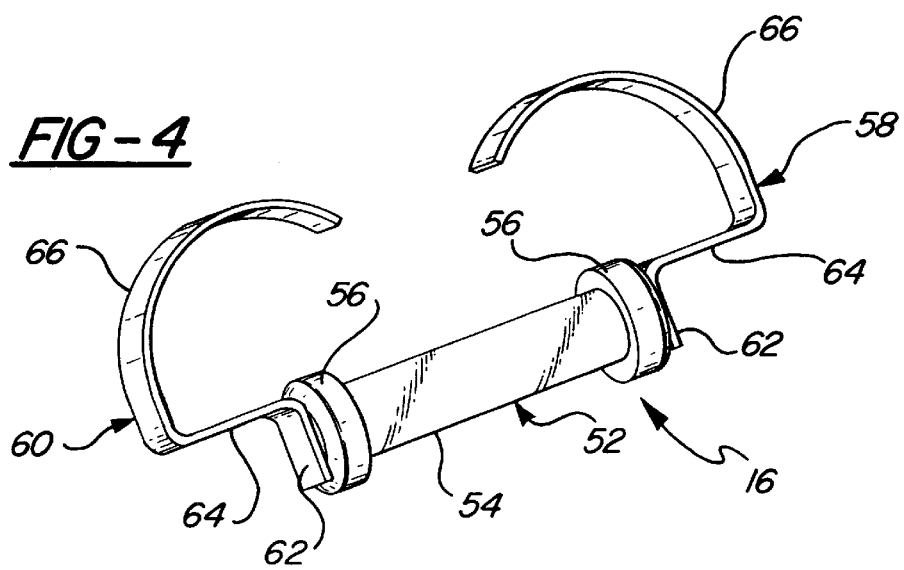

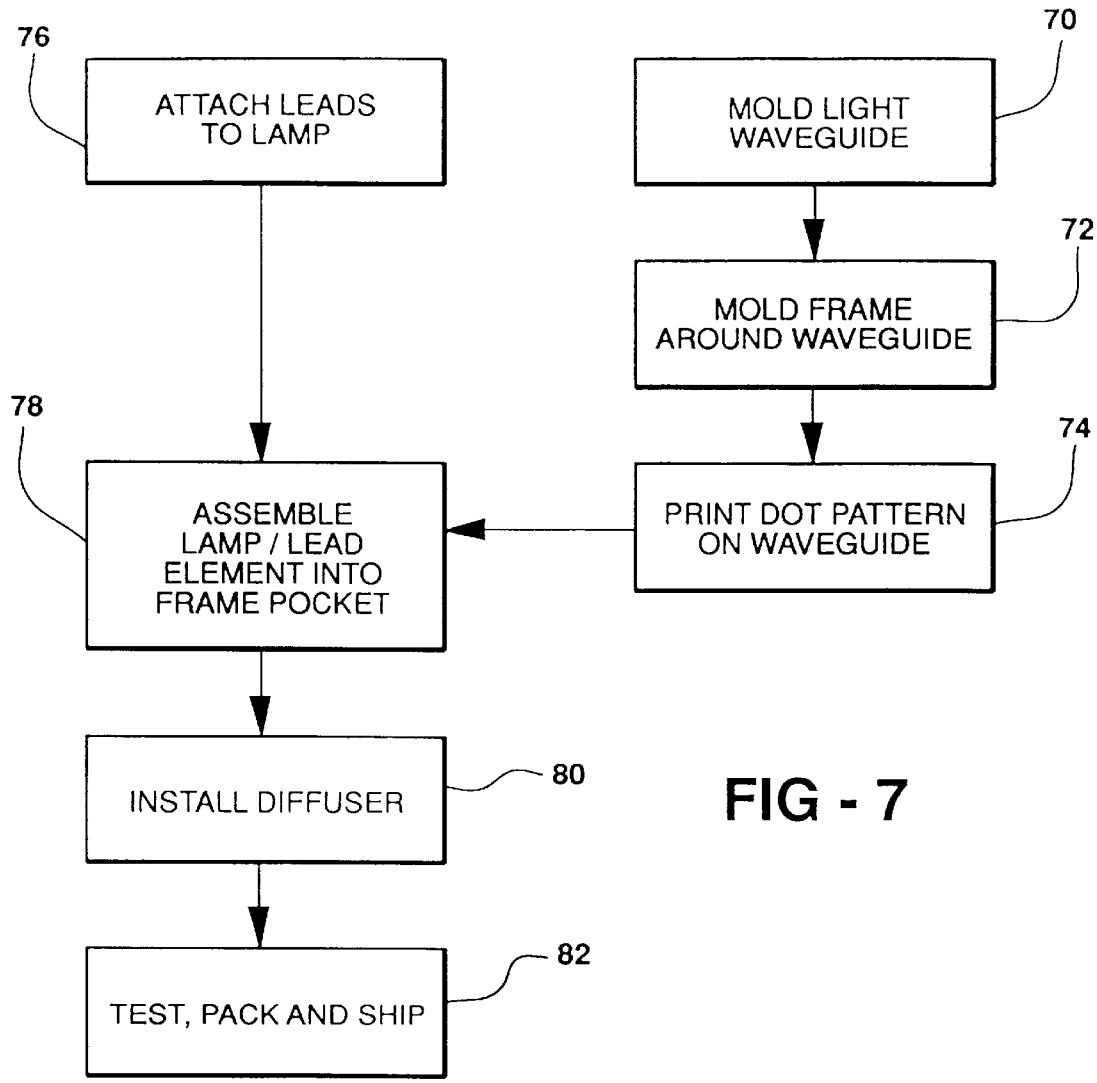
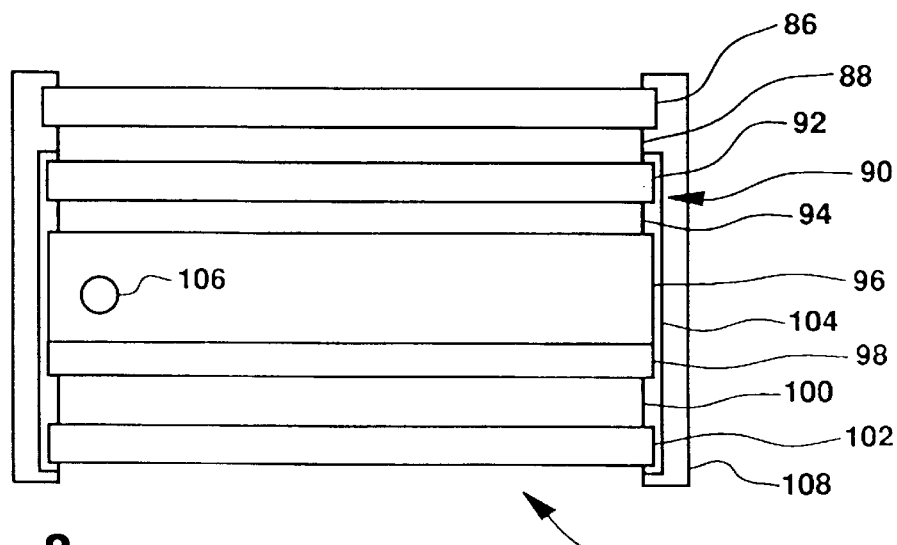

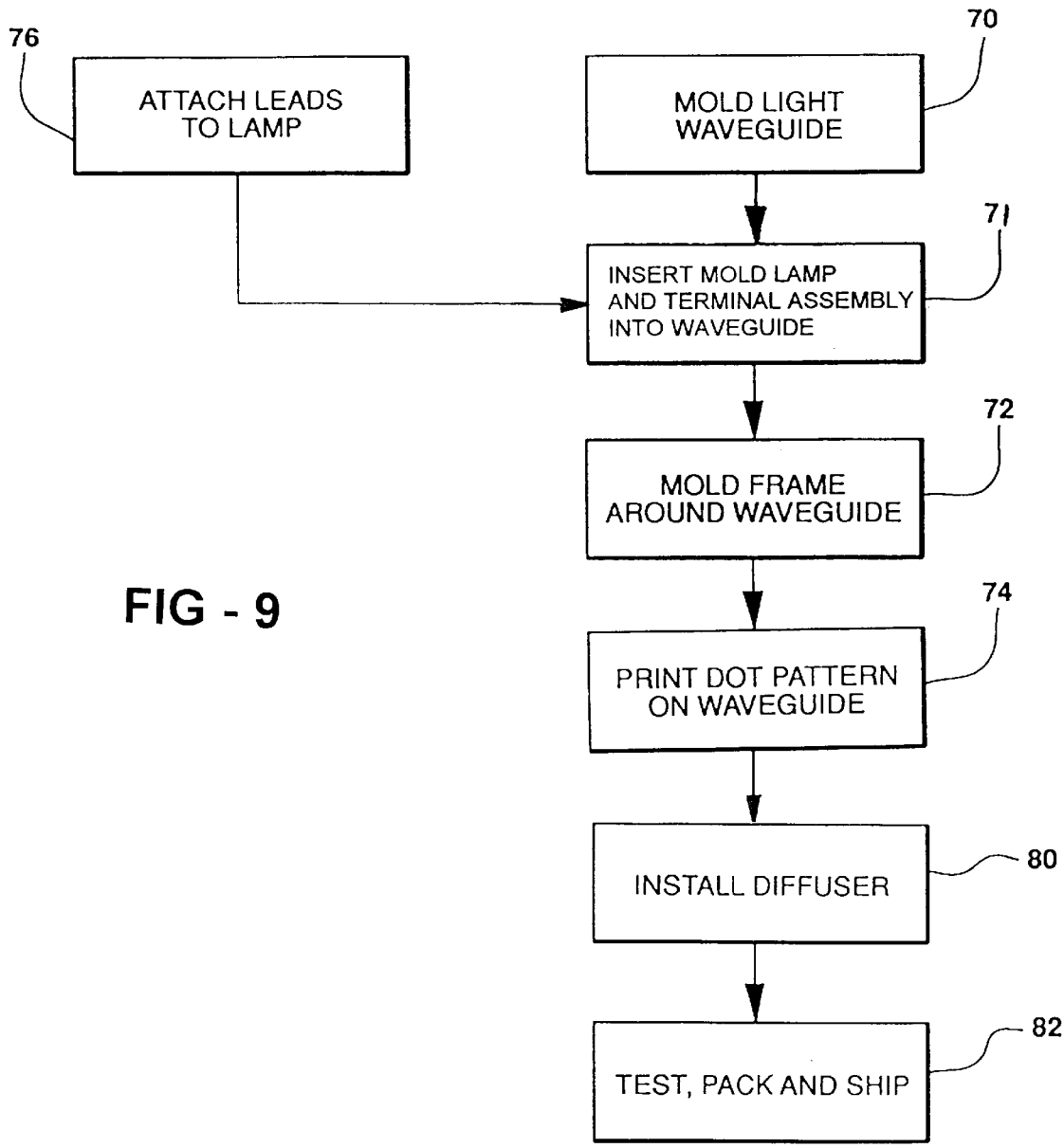

BACK LIGHTING DEVICE WITH CENTRAL OPENING FRAME MEMBER AND A UNITIZED LAMP AND RIGID RADIALLY EXTENDED TERMINALS ASSEMBLY

CROSS REFERENCE TO RELATED APPLICATIONS

This application claims the benefit of U.S. Provisional Patent Application Ser. No. 60/036,320, filed Jan. 31, 1997.

FIELD OF THE INVENTION

This invention relates to a back lighting device for back lighting a liquid crystal display or other device and more particularly to a back lighting device of simplified construction having more efficient light utilization and light output.

BACKGROUND OF THE INVENTION

Liquid crystal displays are used extensively in cellular telephones, pagers, watches, etc. Such displays are illuminated by light panels referred to as back lighting devices. Conventional devices generally utilize a light source mounted adjacent a plastic light waveguide for containing light from the light source entering the waveguide. Light is extracted from the waveguide by providing a surface that changes the reflective or transmissive characteristics of the waveguide causing light striking the surface to be transmitted out of the waveguide.

These conventional devices suffer from light loss associated with inefficient light coupling with the light source being placed next to the plastic waveguide. In conventional devices, the light source is often placed in a pocket in a clear plastic frame and a light waveguide or light sheet is positioned adjacent the light source in the frame. This pocket in the frame supports the light source. Electrical leads are electrically connected to the light source and are typically placed in a pocket adjoining the light source pocket, away from the light sheet. A reflective material, typically foil, is placed around the light source pocket and the area of the light sheet adjoining the light source pocket to reflect light into the light sheet. Foil is typically placed around the edges of the frame to reflect light striking it back into the light sheet.

In such a construction, the frame absorbs light, the light reflected is not efficiently useable and there is lack of a means to precisely position the light source. This results in a device that requires more power to provide a given level of illumination than is necessary.

In addition to these and other disadvantages associated with conventional back lighting devices, a differently sized back lighting device must be manufactured for a differently sized application.

SUMMARY OF THE INVENTION

The present invention provides a back lighting device for liquid crystal displays having improved light coupling between a light source and a light waveguide through the precise positioning of the light source relative to the light waveguide and the mounting of the light source in diffusive surroundings open to the light waveguide.

The present invention also provides a back lighting device having improved light output for a given light input. In providing the improved light output, the device outputs a combination of light extracted via a light extracting surface of the waveguide as well as light reflected from an opposed reflective surface of the waveguide.

The waveguide can be assembled into a frame to provide reflection of light from the waveguide edges back into the waveguide. It can be interchangeably used with different shaped frames for various applications.

More specifically, a back lighting device according to the present invention includes a unitized lamp and terminal assembly or lamp/lead element wherein a lamp member is connected to two rigid terminals which lie in a radially extending plane of the lamp member. The device includes a frame member having sides defining a central opening with inner frame edges sized to receive and support a light waveguide or light sheet. The waveguide can be insert molded, ultrasonically welded, snapped or glued into the frame The frame inner edges are diffusive and preferably white in color. Most preferably, the frame member is made of white plastics material.

The frame includes a recess or pocket extending longitudinally in one of the frame sides adjacent to one of the frame inner edges. The pocket includes an inner opening along the side of the pocket facing the frame central opening for receiving a portion of the waveguide. A rear opening is provided for installing the lamp and terminal assembly in the pocket.

Each terminal of the unitized lamp and terminal assembly includes a leg portion extending longitudinally relative to the lamp member. These leg portions are supported by longitudinally extending seat portions formed in the pocket and they support the lamp member in an optimal front to rear position relative to the waveguide. In such a construction, the lamp member "floats", allowing for the optimal vertical positioning which is difficult to achieve in devices where the lamp member is seated. In addition, the lamp and terminal assembly can be placed further from the light waveguide, lowering the lamp end brightness and making the light distribution more uniform (lengthwise).

A diffuser is mountable and supported on the frame. The diffuser closes the rear of the central opening in the frame and includes a tab which closes the rear opening of the pocket in which the lamp member is positioned. The diffuser may be snapped, glued or welded into the frame to secure the lamp and terminal assembly. Preferably, the diffuser has a white surface facing the light sheet and lamp member. Thereby, all the light emitted by the lamp member is directed to the light sheet resulting in a brighter display than conventional back light devices.

With such a construction, the frame supports the light waveguide or light sheet and the unitized lamp and terminal assembly. The outside shape and size of the frame can be varied to allow the back light device to be used for multiple applications.

The above back light device can be made by molding the frame around the light waveguide, for instance by injection molding using a vertical injection molding machine and a rotary table supporting dies in which the light waveguides are placed. The lamp and terminal assembly can then be automatically or manually mounted in the frame and the diffuser can be assembled onto the frame.

A variable dot diameter or dot spacing pattern can be provided on the bottom or top surface of the waveguide. In addition, a light pick-up can be molded or stamped into the light waveguide.

The back light device can be combined with a LCD and eliminate the need for a transflector on the LCD. In such an application, the back light device functions as a reflector for daytime LCD viewing. Such application results in increased brightness and lower lamp current requirements.

Furthermore, the back light device can include a polarizing film printed with dots on the bottom side of the waveguide, thereby eliminating the polarizer and transflector from the LCD.

The lamp member can be provided with a colored boot or filter that would cause the device to provide night vision colors. An enhancer such as a 3M Brightness Enhancement Film can be provided above the light waveguide to further enhance brightness and this enhancer can be combined with a polarizer.

The light extracting material applied onto the waveguide upper or lower surface includes a light scattering element which causes the light in the light sheet to be diffused out of the front face of the waveguide and reflected towards the diffuser adjacent the rear face. Preferably the light scattering element is applied so as to form a light extracting gradient of increasing density in a direction progressing away from the lamp member. It is generally formed of a dot pattern with open spaces between the dots. The light scattering element can be paint or ink that is either painted or printed onto the front or rear face of the light waveguide. Alternatively the light scattering element is a film, having a light extracting gradient therein, attachable to the upper or lower surface of the waveguide. The reflective white plastic diffuser mounted behind the waveguide reflects light from the light scattering element back through the top surface of the waveguide through the open spaces between the dots of the light scattering element, approximately doubling the light output of the back lighting device vis-a-vis conventional back lighting devices.

In order to increase the interchangeability of the light waveguide, various sized frames can be used for framing the light waveguide. In this way, the same light waveguide can be used in different applications, i.e. cellular telephones, pagers, etc. Preferably the frame is of white plastics material and includes white inside edges exhibiting diffuse reflective properties to enhance light reflectivity back into the light waveguide.

A method of making such a back lighting device according to the invention may include the steps of:

forming an assembly including a frame and a light waveguide mounted in the frame, the frame including a pocket having an inner opening receiving an outer edge portion of the waveguide and a rear opening for receiving a lamp into the pocket, and longitudinally extending seat portions formed in the frame on opposite ends of the pocket;

forming a lamp and terminal assembly including a lamp member connected at opposite ends to rigid terminals including leg portions extending longitudinally from said ends;

inserting the lamp and terminal assembly into the pocket through the rear opening with the leg portions seated upon the seat portions to align the lamp member with the outer edge portion of the waveguide; and providing light loss limiting means for limiting light loss through the rear opening of the pocket and for limiting light loss from a rear side of said waveguide.

These and other features and advantages of the invention will be more fully understood from the following detailed description of the invention taken together with the accompanying drawings.

BRIEF DESCRIPTION OF THE DRAWINGS

In the drawings:

FIG. 1 is an exploded pictorial rear view of a back lighting device formed according the invention;

FIG. 2 is a pictorial front view of a frame for the device of FIG. 1;

FIG. 3 is a pictorial front view of a waveguide for the device of FIG. 1;

FIG. 4 is a pictorial view of a lamp and terminal assembly for the device of FIG. 1;

FIG. 7 is a flow chart illustrating an exemplary manufacturing method for the back lighting device of FIGS. 1 and 6;

FIG. 8 is a schematic side view of the back lighting device formed according to one embodiment of the invention; and FIG. 9 is a flow chart illustrating an alternative manufacturing method for the back lighting devices of FIGS. 1 and 6.

DETAILED DESCRIPTION OF THE INVENTION

Figure 5:
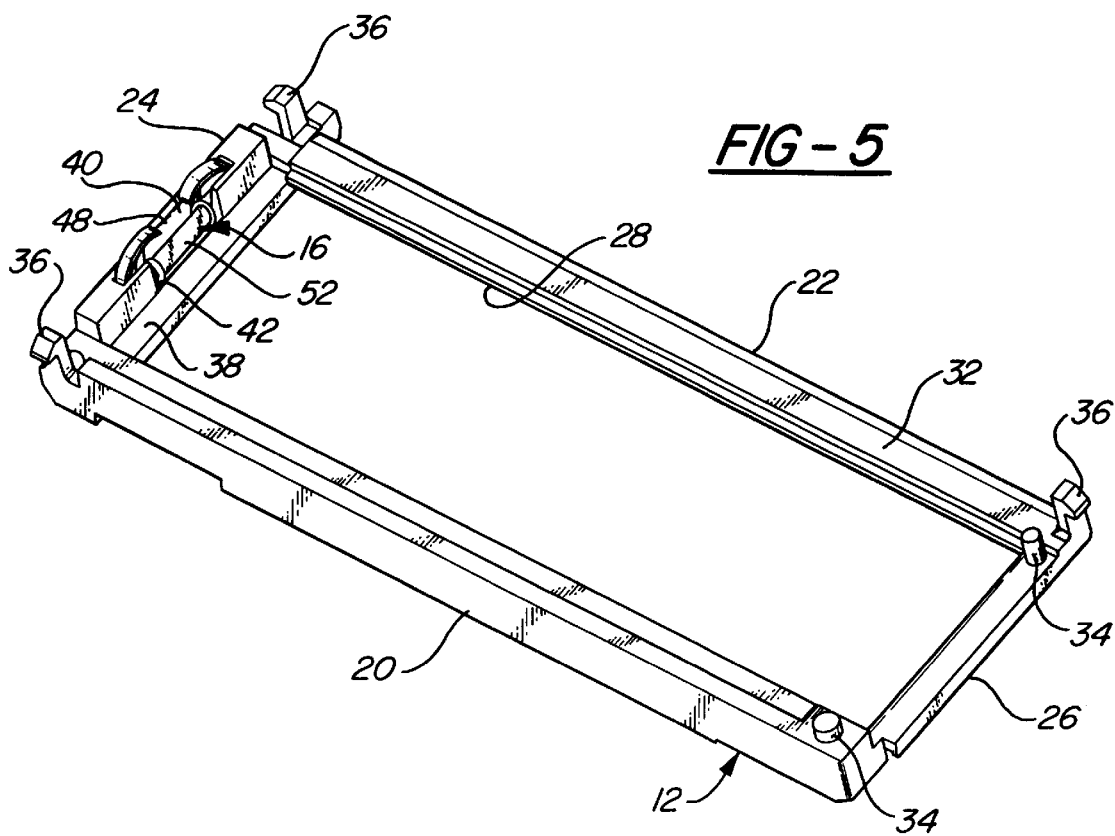
FIG. 5 is a pictorial rear view of a frame and lamp assembly (waveguide omitted) for the device of FIG. 1.
Figure 6:
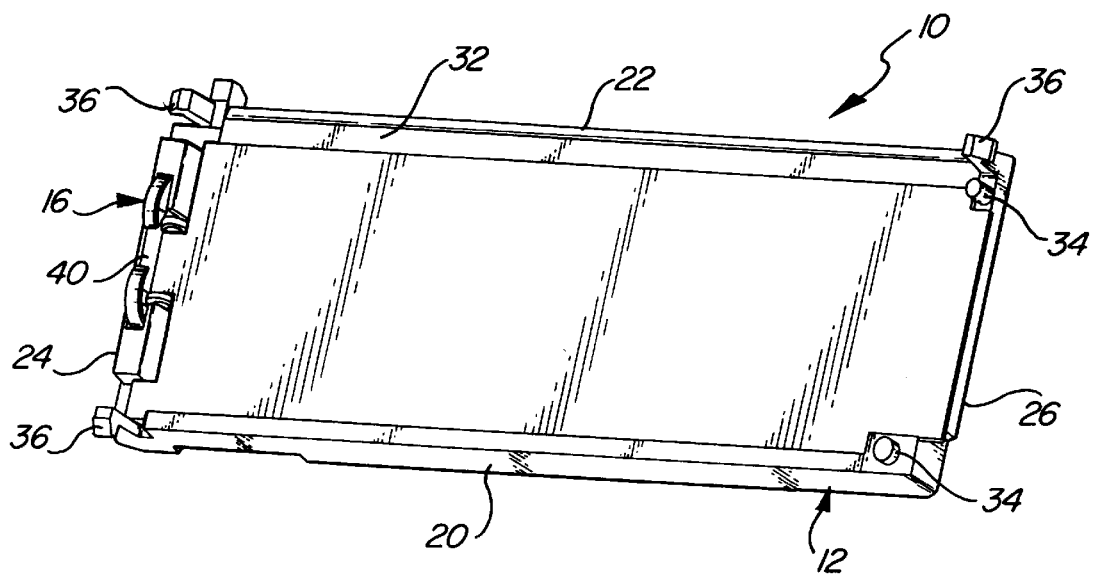
FIG. 6 is a pictorial rear view of the fully assembled back lighting device of FIG. 1.

Referring first to FIGS. 1–6 of the drawings in detail, and in particular to FIGS. 1 and 6, numeral 10 generally indicates a back lighting device formed in accordance with the invention. Device 10 is especially configured for use as a backlight for a liquid crystal display in a pager; however, by appropriate reconfiguration of the frame and other elements if needed, the device could equally well be applied in other back lighting applications.

Back lighting device 10 includes as major elements a frame 12, a light waveguide or light sheet 14, a lamp and terminal assembly 16, and a diffuser sheet 18. Frame 12, as shown from the front in FIG. 2, includes top, bottom, left and right sides 20, 22, 24, 26, respectively, with inner edges defining a central opening 28. The opening and a surrounding front face 30, of the frame are configured for mounting behind a liquid crystal display in a pager or other suitable device. The opposite rear face 32, shown in FIGS. 1, 5 and 6, includes locating dowels 34 and snap tabs 36 for mounting the frame in a support, not shown.

Central opening 28 of the frame is configured to receive the waveguide or light sheet 14, which may have planar front and rear surfaces, and edges shaped to fit the opening 28. The left side 24 of the frame 12 includes a ledge 38 adjacent a rearward extending portion in which is formed a pocket 40 extending longitudinally in the left side 24 toward the top and bottom sides 20, 22 of the frame. Pocket 40 has an inner opening 42 connecting the pocket with the ledge 38 and the central opening 28 of the frame. In assembly, a short tab 44 on the left end of the waveguide 14 extends into the inner opening to align the waveguide with the pocket 40 and the lamp and terminal assembly 16. Holes 46 or an alternative feature may be provided to secure the waveguide in an insert mold.

Pocket 40 is also provided with a rear opening 48 extending through the rear face of the frame Opening 48 and the pocket 40 extend longitudinally beyond the inner opening 42. Longitudinal seat portions 50 are formed at the ends of the pocket 40 and extend beyond the side opening 42.

The lamp and terminal assembly 16, as shown in FIG. 4, is made up of a conventional illuminating lamp member 52 having a tubular light emitting body 54 mounted to enlarged metallic end members 56. Preshaped terminals 58, 60 include tabs 62 that are soldered directly to the end members 56. Longitudinal leg portions 64 extend outward from the tabs and join with connecting portions 66 curving radially outward in a common plane with the lamp member 52.

As is best seen in FIG. 5, the lamp member 52 is received in the pocket 40 of the frame with the lamp member 52 aligned with the inner opening 42 and supported in the pocket on the longitudinal leg portions 64 which are seated on the seat portions 50. The leg and seat portions are so positioned as to support the lamp body 54 in front to rear alignment with the tab 44 of the waveguide 14 so that the lamp 52 is optimally positioned for directing light into the waveguide. The connecting portions 66 of the terminals 58, 60 extend rearward, out through the rear opening 48 for connection with electric contact means, not shown, provided in an associated support in which the back lighting device is to be mounted.

The diffuser sheet 18 is assembled to the rear face 32 of the frame 12 to close the rear side of the central opening 28 and cover the rear surface of the waveguide 14. At its' left end, the diffuser sheet 18, includes a tab 68 which extends across and closes the central portion of the rear opening 48 of pocket 40 in the frame. As shown in FIG. 6, the tab 68 thereby covers the lamp member 16 so as to limit the escape of light from the pocket 40 and/or contain the lamp and terminal assembly in pocket 40.

Preferably, the waveguide or light sheet 14 is formed in a conventional manner, such as molding, from a suitable light transmitting transparent waveguide material. The frame 12 is preferably formed from a white glass filled material which reflects light from the lamp member 52 within the frame and into the waveguide 14. The diffuser 18 may be made of any acceptable white, light scattering material. The white surface provides better reflection and diffusion of light into the waveguide and less light loss in the frame than clear frames with reflective elements commonly utilized in other back lighting devices. As is known in the art, an air gap is required between the waveguide and the diffuser.

Back lighting device 10 may be formed and assembled in any suitable manner and its various elements may be retained together by any suitable means. FIG. 7 illustrates a presently preferred method of assembly which includes the following steps illustrated by numbered boxes of a flow chart.

In a first step 70 a light waveguide or light sheet insert 14 is formed, such as by molding, from a clear plastics material.

In a second step 72, a frame 12 of white plastics material is molded around the waveguide so that the frame and waveguide form a unitary assembly. Alternatively it would be possible to form these members separately and snap or otherwise retain the waveguide within the frame. In the molding process, the retaining holes 46 of the waveguide are filled with the molded frame material to positively retain the waveguide in place in the frame.

In a third step 74, a light controlling dot pattern is printed on the face of the waveguide to distribute the emission of light evenly across the front face of the waveguide.

In a contemporaneous fourth step 76, the terminals 58, 60 are soldered to the ends of a lamp member 52 to form a lamp and terminal assembly or lamp/lead element 16.

In a fifth step 78, the lamp and terminal assembly is installed in a pocket 40 in the frame 12 with leg portions 64 seated on seat portions 50 of the frame to locate the lamp member 52 in front to rear alignment with a tab 44 of the waveguide.

In a sixth step 80, a diffuser 18 is installed on the rear face 32 of the frame 12, covering the rear of waveguide 14 and the light pocket 40.

Finally, in a seventh step 82, the back lighting device 10 is tested, packed and shipped to a customer.

Referring now to FIG. 8, there is shown schematically a final assembly 84 of one form of product incorporating one form of the invention. Assembly 84 includes a liquid crystal display (LCD) 86 spaced by an air gap 88 from a back lighting device 90 of the present invention.

The back lighting device 90 includes, from front to rear, a known optional enhancement film 92 such as 3M Brightness enhancement Film II for increasing the brightness and uniformity of the display transmitted to the viewer. An air gap 94 separates the film 92 from a waveguide 96. A polarizing film 98 is adhered to the back of the waveguide and includes a variable dot pattern on its rear surface. An air gap 100 then separates the waveguide 96 with applied film 98 from a diffuser 102 mounted at the rear of the assembly.

The back lighting device 90 may be mounted within a frame 104 which may include a pocket for receiving a lamp and terminal assembly 16 as previously described, but not illustrated in FIG. 8. Alternatively, as illustrated in FIG. 9 a similar lamp and terminal assembly 106 could be insert molded, Step 71, into the waveguide 96, after which the waveguide could be molded into the frame as previously described. The back lighting device 90 and LCD 86 are then assembled into a common housing 108 to form the final assembly 84.

Although the invention has been described by reference to certain specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A back lighting device characterized by:
    a frame member having front and rear faces and sides with inner edges defining a central opening;
    a light waveguide mounted in said frame inner edges and closing the central opening, said waveguide including an outer edge portion for receiving light into the waveguide and a front surface through which light is extracted for use in back lighting;
    a pocket extending longitudinally in one of said sides of the frame member and having an inner opening through one of said inner edges, said side opening receiving said outer edge portion of the waveguide, said pocket also having a rear opening through said rear face of the frame member and longitudinally extending seat portions formed in the frame on opposite ends of the pocket; and
    a unitized lamp and terminal assembly including a lamp member connected at opposite ends to rigid terminals lying in a radially extending plane of the lamp member, each terminal including a leg portion extending longitudinally from one of said ends, said leg portions engaging said seat portions of the pocket for supporting the lamp member in an optimal front to rear position relative to the waveguide for transmitting light from the lamp member into the waveguide.

2. A back lighting device as in claim 1, including a diffuser mounted on the rear side of the frame behind the waveguide, said diffuser including a tab extending across said pocket and closing said rear opening of the pocket opposite said lamp to limit the escape of light through said rear opening and contain the lamp member in the pocket.

3. A back lighting device as in claim 2 wherein said terminals each include a connecting portion extending laterally rearward from their respective leg portions and outward from the respective seat portions of the frame and beyond said diffuser for connecting said lamp with an associated electric power source.

4. A back lighting device as in claim 2 wherein said frame and said diffuser have white surfaces facing the waveguide and the lamp member for reflecting light from the lamp member toward the waveguide.

5. A back lighting device as in claim 4 wherein said frame and said diffuser are formed of white material.

6. A back lighting device as in claim 1 wherein said frame is of white plastics material and is molded about said light waveguide.

7. A back lighting device characterized by:
 a frame member having front and rear faces and sides with inner edges defining a central opening;
 a light waveguide mounted in said frame inner edges and closing the central opening, said waveguide including an outer edge portion for receiving light into the waveguide and a front surface through which light is extracted for use in back lighting;
 a unitized lamp and terminal assembly mounted relative to said waveguide adjacent one end, said assembly including a lamp member connected at opposite ends to rigid terminals lying in a radially extending plane of the lamp member, the lamp member positioned optimally for transmitting light from the lamp member into the waveguide; and
 a diffuser mounted on the rear side of the frame behind the waveguide, said diffuser closing the rear of said central opening and extending behind said lamp member to limit the escape of light from the lamp member and from the waveguide through said rear of the opening and to reflect diffused light through the waveguide for transmission to a viewer.

8. A back lighting device as in claim 7 wherein said lamp member is insert molded into said waveguide adjacent said one end.

9. A back lighting device as in claim 7 wherein said lamp member is mounted within a pocket in said frame and supporting said lamp member in optimal front to rear position relative to the waveguide for transmitting light from the lamp member into the waveguide, said waveguide also closing a rear opening of said pocket.

10. A back lighting device as in claim 7 and further including a polarizing film adherent on a rear surface of said waveguide and provided with a light distributing pattern thereon.

11. A back lighting device as in claim 7 and further including brightness enhancing film spaced from a front surface of the waveguide to improve the delivery of light from the waveguide to a viewer.

12. A method of making a back lighting device, said method characterized by the steps of
 forming an assembly including a frame member having front and rear faces and defining a central opening and a light waveguide mounted in the frame central opening;
 forming a pocket in a side of said frame, said pocket having a rear opening through said rear face of said frame;
 forming a lamp and terminal assembly including a lamp member connected at opposite ends to rigid terminals including connecting portions extending radially from said ends;
 mounting said lamp and terminal assembly adjacent one end of said waveguide and in an optimal front to rear position relative to said waveguide for transmitting light from the lamp member into the waveguide; and
 providing light loss limiting means for limiting light loss through said rear opening of the pocket and for limiting light loss from a rear side of said waveguide.

13. A method as in claim 12 wherein said step of forming an assembly includes first forming said waveguide and then molding said frame around the waveguide.

14. A method as in claim 12 and further including:
 forming a pocket in the frame having an inner opening receiving an outer edge portion of the waveguide and a rear opening for receiving said lamp and terminal assembly into the pocket, the pocket including longitudinally extending seat portions formed on opposite ends of the pocket;
 forming said lamp and terminal assembly with said rigid terminals including leg portions extending longitudinally from said ends; and
 inserting said lamp and terminal assembly into said pocket through said rear opening with said leg portions seated upon said seat portions to align said lamp member with an outer edge portion of the waveguide.

15. A method as in claim 14 wherein said step of providing light loss limiting means includes installing a diffuser on the frame behind said waveguide to close a rear face of the device, said diffuser having a tab extending across said rear opening to limit light loss therethrough.

16. A method as in claim 15 wherein said tab extending across said rear opening also retains said lamp and terminal assembly in said pocket.

17. A method as in claim 12 and further including the step of:
 insert molding said lamp and terminal assembly into said waveguide adjacent said one end thereof prior to said step of forming an assembly of said frame and said waveguide.

18. A method as in claim 17 wherein said step of forming an assembly includes first forming said waveguide and then molding said frame around the waveguide.

* * * * *